United States Patent
Hsiao (10) Patent No.: US 12,292,921 B2
(45) Date of Patent: May 6, 2025

(54) METHOD FOR IMAGE SEARCH, ELECTRONIC DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Jenhao Hsiao, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 477 days.

(21) Appl. No.: 17/955,258

(22) Filed: Sep. 28, 2022

(65) Prior Publication Data

US 2023/0018680 A1   Jan. 19, 2023

Related U.S. Application Data

(63) Continuation of application No. PCT/CN2021/070496, filed on Jan. 6, 2021.
(Continued)

(51) Int. Cl.
*G06F 16/583* (2019.01)
*G06F 16/538* (2019.01)
(Continued)

(52) U.S. Cl.
CPC .......... *G06F 16/583* (2019.01); *G06F 16/538* (2019.01); *G06F 18/22* (2023.01); *G06V 10/44* (2022.01)

(58) Field of Classification Search
CPC .. G06V 20/698; G06V 20/693; G06V 20/695; G06V 10/25; G02B 21/008;
(Continued)

(56) References Cited

U.S. PATENT DOCUMENTS 5,675,819 A   10/1997 Schuetze
11,200,269 B2 * 12/2021 Ke .......................... G06N 5/022
(Continued)

OTHER PUBLICATIONS

Li et al. Person Search with Natural Language Description, IEEE. (Year: 2017).*
(Continued)

*Primary Examiner* — John B Strege
(74) *Attorney, Agent, or Firm* — Young Basile Hanlon & MacFarlane, P.C.

(57) ABSTRACT

A method for image search, an electronic device, and a non-transitory computer-readable storage medium are provided. The method includes the following. Receive a query text. Process the query text to obtain a first multi-dimensional word vector. Perform, with a text gated network in a dual gate network, a first weighted operation on the first multi-dimensional word vector to obtain a second multi-dimensional word vector. Search for at least one target image according to the second multi-dimensional word vector and a second multi-dimensional visual vector for each image in an image file. The second multi-dimensional visual vector for each image is obtained by performing, with a visual gated network in the dual gate network, a second weighted operation on a first multi-dimensional visual vector for each image, and the second multi-dimensional word vector and the second multi-dimensional visual vector for each image are in a same space.

20 Claims, 3 Drawing Sheets

Related U.S. Application Data (60) Provisional application No. 63/017,483, filed on Apr. 29, 2020.

(51) Int. Cl.
  *G06F 18/22*  (2023.01)
  *G06V 10/44*  (2022.01)

(58) Field of Classification Search
  CPC ........ G02B 21/26; G01N 15/10; G01N 21/84; G01N 2015/1006
  See application file for complete search history.

(56) References Cited

U.S. PATENT DOCUMENTS

| | | | |
|---|---|---|---|
| 2008/0281814 A1 | 11/2008 | Calistri-Yeh et al. | |
| 2013/0046748 A1* | 2/2013 | Bennett | G06F 16/58 707/E17.108 |
| 2017/0228599 A1* | 8/2017 | De Juan | G06V 20/70 |
| 2018/0101767 A1* | 4/2018 | Huang | G06N 3/044 |
| 2018/0365321 A1 | 12/2018 | Ke et al. | |
| 2019/0108280 A1* | 4/2019 | Liu | G06F 16/951 |
| 2019/0251167 A1 | 8/2019 | Krishnapura Subbaraya et al. | |
| 2021/0383062 A1* | 12/2021 | Liu | G06N 3/084 |
| 2024/0037948 A1* | 2/2024 | Chen | G06V 20/46 |

OTHER PUBLICATIONS

Li et al. Dynamic Dual Gating Neural Networks, IEEE (Year: 2021).*

International Search Report and Written Opinion for International Application No. PCT/CN2021/070496 mailed Apr. 7, 2021.

Yi Zhu et al. Gated Transfer Network for Transfer Learning, dated Oct. 30, 2018.

* cited by examiner

FIG. 1

Search results when "music" is input for image search

FIG. 2

Search results when "monk" is input for image search

METHOD FOR IMAGE SEARCH, ELECTRONIC DEVICE, AND NON-TRANSITORY COMPUTER-READABLE STORAGE MEDIUM

CROSS-REFERENCE TO RELATED APPLICATION(S)

This application is a continuation application of International application No. PCT/CN2021/070496, filed Jan. 6, 2021, which claims priority to and benefit of U.S. Provisional Application Patent Ser. No. 63/017,483 filed Apr. 29, 2020, the entire disclosures of both of which are hereby incorporated by reference.

TECHNICAL FIELD

This disclosure relates to the technical field of image search, and more particularly to a method for image search, an electronic device, and a non-transitory computer-readable storage medium.

BACKGROUND

At present, it is common to use electronic devices having cameras such as smartphones to take photos. For the electronic device storing a large number of photos, it may be a challenge for a user to scroll backward to find one or more photos taken a few days ago, let alone months or years ago, and thus image search engines have been developed for image search. However, for the existing image search engines, to find a desired image/photo, a user needs to input an exact or pre-defined query term.

SUMMARY

According to an implementation, a method for image search is provided. The method includes the following. Receive a query text. Process the query text to obtain a first multi-dimensional word vector. Perform, with a text gated network in a dual gate network, a first weighted operation on the first multi-dimensional word vector to obtain a second multi-dimensional word vector. Search for at least one target image according to the second multi-dimensional word vector and a second multi-dimensional visual vector for each of multiple images in an image file. The second multi-dimensional visual vector for each image is obtained by performing, with a visual gated network in the dual gate network, a second weighted operation on a first multi-dimensional visual vector for each image, and the second multi-dimensional word vector and the second multi-dimensional visual vector for each image are in a same space.

According to an implementation, an electronic device is provided. The electronic device includes a processor and a memory configured to store at least one computer program. The at least one computer program, when executed by a processor, is operable with the processor to perform the following. Receive a query text. Process the query text to obtain a first multi-dimensional word vector. Perform, with a text gated network in a dual gate network, a first weighted operation on the first multi-dimensional word vector to obtain a second multi-dimensional word vector. Search for at least one target image according to the second multi-dimensional word vector and a second multi-dimensional visual vector for each of multiple images in an image file. The second multi-dimensional visual vector for each image is obtained by performing, with a visual gated network in the dual gate network, a second weighted operation on a first multi-dimensional visual vector for each image, and the second multi-dimensional word vector and the second multi-dimensional visual vector for each image are in a same space.

According to an implementation, a non-transitory computer-readable storage medium is provided. The storage medium stores at least one computer program. The at least one computer program, when executed by a processor of an electronic device, is operable with the processor to perform the following. Receive a query text. Process the query text to obtain a first multi-dimensional word vector. Perform, with a text gated network in a dual gate network, a first weighted operation on the first multi-dimensional word vector to obtain a second multi-dimensional word vector. Search for at least one target image according to the second multi-dimensional word vector and a second multi-dimensional visual vector for each of multiple images in an image file. The second multi-dimensional visual vector for each image is obtained by performing, with a visual gated network in the dual gate network, a second weighted operation on a first multi-dimensional visual vector for each image, and the second multi-dimensional word vector and the second multi-dimensional visual vector for each image are in a same space.

BRIEF DESCRIPTION OF DRAWINGS

To describe technical solutions in implementations of the present disclosure more clearly, the following will briefly introduce accompanying drawings required for describing the implementations. Apparently, the accompanying drawings in the following description merely illustrate some implementations of the present disclosure. Those of ordinary skill in the art may also obtain other accompanying drawings based on these accompanying drawings without creative efforts.

DETAILED DESCRIPTION

In order to make the purpose, technical solutions, and advantages of the present disclosure clear, the following will describe the present disclosure in detail with reference to the accompanying drawings and implementations. It should be understood that the implementations described herein are only used to explain the present disclosure and not used to limit the present disclosure.

The terms "first", "second", "third", "fourth", and the like used in the specification, the claims, and the accompany drawings of the present disclosure are used to distinguish different objects rather than describe a particular order. Further, the terms "include", "comprise", and "have" as well as variations thereof are intended to cover non-exclusive inclusion. For example, a process, method, system, product, or apparatus including a series of steps or units is not limited to the listed steps or units; on the contrary, it can optionally include other steps or units that are not listed; alternatively, other steps or units inherent to the process, method, product, or device can be included either.

An electronic device described in the implementations of the present disclosure may include a smart phone (such as an Android® phone, an iOS® phone, and a Windows® phone), a tablet computer, a palmtop computer, a notebook computer, a mobile Internet device (MID), wearable equipment, or the like, which are not exhausted but only listed as examples.

Figure 1:
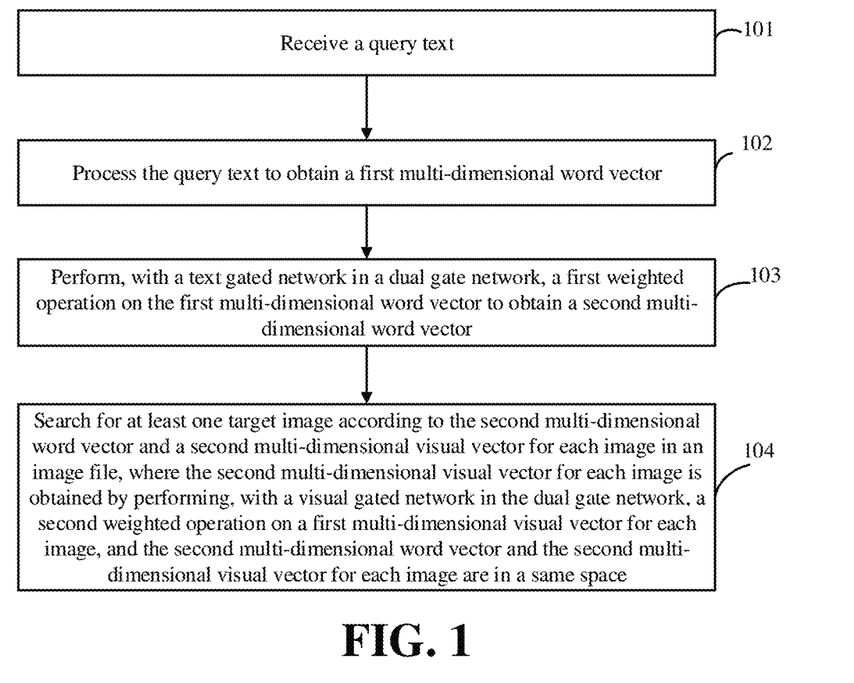
FIG. 1 is a schematic flow chart illustrating a method for image search according to an implementation of the present disclosure.

FIG. 1 is a flow chart illustrating a method for image search according to an implementation of the present disclosure. The method begins at block 101.

At block 101, receive a query text.

In an implementation, the method is applied to an electronic device such as a smart phone. When an interface for image search is opened, a user can input a text ("query text") into a search bar for searching for one or more desired images. As an example and not by way of limitation, the text may be "car", "music", "monk", or other.

At block 102, process the query text to obtain a first multi-dimensional word vector.

In an implementation, a standard language mode can be used to process the query text to obtain the first multi-dimensional word vector. The language mode learns to represent each term as a fixed length embedding vector by predicting adjacent terms in a document. The vector representations are called word vectors. In the implementation, follow Mikolov's method and create a 300-dimensional word vector to represent each image label in the database. For the details of the language mode, reference can be made to Tomas Mikolov et al, Distributed Representations of Words and Phrases and Their Compositionality, NIPS 2013, which will not be described in detail in the implementation of the present disclosure.

In an implementation, as an example and not by way of limitation, the first multi-dimensional word vector is a 300-dimensional word vector, that is, the first multi-dimensional word vector corresponds to a point in a 300-dimensional space (hereinafter, a first space).

At block 103, perform, with a text gated network in a dual gate network, a first weighted operation on the first multi-dimensional word vector to obtain a second multi-dimensional word vector.

In an implementation, the text gated network is represented as $y_{text}=G_{text}(x) \otimes x_{text}$, where $x_{text}$ represents the first multi-dimensional word vector, $y_{text}$ represents the second multi-dimensional word vector, $G_{text}(x)$ is a gating function (i.e., gated network) and represents feature map weights to be learned, $\otimes$ is a channel-wise multiplication between the first multi-dimensional word vector $x_{text}$ and the gating function $G_{text}(x)$, $G_{text}(x)=\sigma_{sigmoid}(W_2\sigma_{RELU}(BN(W_1 x_{text})))$, $W_1$ and $W_2$ represent two fully-connected layers, BN(•) is a batch normalization layer, $\sigma_{RELU}$ and $\sigma_{sigmoid}$ are activation functions of ReLU and Sigmoid respectively. For example, when $G_{text}(x)$ contains all 1s, all the learned features pass through without gating, which is basically a classic fine-tuning approach and will not be illustrated in detail herein.

In an implementation, the second multi-dimensional word vector refers to a word vector corresponding to a point in a multi-dimensional space (hereinafter, a second space, where the second space is different from the first space).

At block 104, search for at least one target image according to the second multi-dimensional word vector and a second multi-dimensional visual vector for each of multiple images in an image file. The second multi-dimensional visual vector for each image is obtained by performing, with a visual gated network in the dual gate network, a second weighted operation on a first multi-dimensional visual vector for each image, and the second multi-dimensional word vector and the second multi-dimensional visual vector for each image are in a same space (i.e., the second space).

In an implementation, as an example and not by way of limitation, the image file may be a photo album that includes multiple photos taken by a camera of the electronic device.

In an implementation, each image associated with one second multi-dimensional visual vector is obtained as follows. When the image is received, for example, when the camera of the electronic device takes an image, deep features of the image are extracted and the deep features are processed to obtain a first multi-dimensional visual vector for the image. Perform, with the visual gated network, the second weighted operation on the first multi-dimensional visual vector for the image to obtain the second multi-dimensional visual vector for the image. Store the image associated with the second multi-dimensional visual vector in the image file. It is to be understood that each image associated with one second multi-dimensional visual vector in the image file is obtained before the query text is received.

In an implementation, a standard visual model is used to extract deep features of each image and process the deep features of each image to obtain the first multi-dimensional visual vector for each image. The visual mode is based on the ResNet. The deep neural network model includes several convolutional filtering (with skip connections), bath normalization, and pooling layers, followed by several fully connected neural network layers. The visual mode is trained with a softmax output layer to predict one of 1000 object categories from the ILSVRC 2012 1K dataset. The output of the last global-pooling-layer, which is a 2048 dimensional vector, serves as a visual vector for an image (i.e., the first multi-dimensional visual vector for an image). For details of the visual mode, reference can be made to Kaiming He et al, Deep Residual Learning for Image Recognition, CVPR 2016, which will not be illustrated in detail herein.

In an implementation, as an example and not by way of limitation, the first multi-dimensional visual vector for each image is a 2048-dimensional visual vector, that is, the first multi-dimensional visual vector corresponds to a point in a 2048-dimensional space (hereinafter, a third space, wherein the third space is different from the first space and the second space).

In an implementation, the visual gated network is represented as $y_{visual}=G_{visual}(x) \otimes x_{visual}$, where $x_{visual}$ represents the first multi-dimensional visual vector for each image, $y_{visual}$ represents the second multi-dimensional visual vector for each image, $G_{visual}(x)$ is a gating function (i.e., gated network) and represents feature map weights to be learned, $\otimes$ is a channel-wise multiplication between the first multi-dimensional visual vector $x_{visual}$ and the gating function $G_{visual}(x)$, $G_{visual}(X)=\sigma_{sigmoid}(W_2\sigma_{RELU}(BN(W_1 x_{visual})))$, $W_1$ and $W_2$ represent two fully-connected layers, BN(•) is a batch normalization layer, and $\sigma_{RELU}$ and $\sigma_{sigmoid}$ are activation functions of ReLU and Sigmoid respectively. For example, when $G_{visual}(x)$ contains all 1s, all the learned features pass through without gating, which is basically a classic fine-tuning approach and will not be illustrated in detail herein.

In the implementation of the present disclosure, process the query text to obtain the first multi-dimensional word vector, perform, with the text gated network in the dual gate network, the first weighted operation on the first multi-dimensional word vector to obtain the second multi-dimensional word vector in the second space, and search for the at least one target image according to the second multi-dimensional word vector and the second multi-dimensional visual vector for each image (in the second space), where the second multi-dimensional visual vector for each image is obtained by performing, with the visual gated network in the dual gate network, the second weighted operation on the first multi-dimensional visual vector for each image. With the dual gate network, the second multi-dimensional word vector and the second multi-dimensional visual vector for each image can be obtained by utilizing previous knowledge, that is, by selecting features from pre-trained models with the dual gated network, rather than learning new features, a precise visual and text representation for a search task can be created. With the visual and text representation for the search task, the user does not need to input an exact or pre-defined query text for image search.

In an implementation, searching for the at least one target image according to the second multi-dimensional word vector and the second multi-dimensional visual vector for each image in the image file is as follows. For each image, if a distance between the second multi-dimensional visual vector for the image and the second multi-dimensional word vector is smaller than or equal to a distance threshold, determine the image as one target image, otherwise, determine that the image is not a target image.

In an implementation, as an example and not by way of limitation, a standard cosine distance is used to determine the distance between the second multi-dimensional visual vector for each image and the second multi-dimensional word vector, which will not be described in detail herein.

In an implementation, if there are more target images, the target images are displayed in ascending order of distances each being a distance between the second multi-dimensional visual vector for each image and the second multi-dimensional word vector.

In an implementation, the method further includes displaying the at least one target image. The at least one target image is displayed as follows. Output multiple image display modes for selection and display the at least one target image according to a selected image display mode. For example, the image display modes may include a mode of displaying images as thumbnails and a mode of displaying image links, where for the mode of displaying image links, when each image link is selected, for example, clicked, a corresponding image is displayed. Thus, when there are more target images, the user can view the target images without flipping through pages.

In another implementation, display the at least one image as follows. Output the multiple image display modes for selection and display the at least one target image according to a selected image display mode, when the number of the at least one target image is larger than or equal to a number value. Display the at least one image in a default mode (for example, each target image is normally displayed) when the number of the at least one target image is smaller than the number value.

In an implementation, when no target image exists, prompt information is output for prompting the user that no related image is found.

Figure 2:
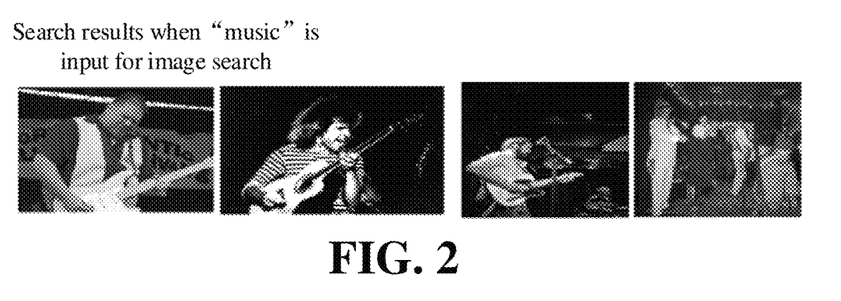
FIGS. 2-3 are schematic diagrams illustrating search results according to an implementation of the present disclosure.
Figure 3:
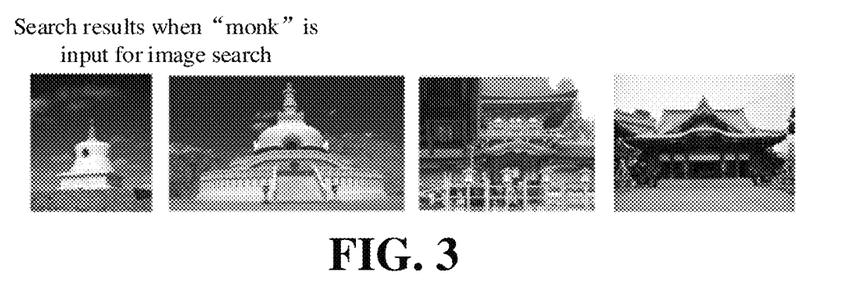

In the implementation of the present disclosure, the method for image search is based on a sematic search so different synonyms will lead to a stable and similar search result. For example, input texts "car", "vehicle", "automobile" would lead to a similar search result, i.e., car-related images will be returned. In addition to find a directly related concept, semantically related concept can also be retrieved, i.e., perform a fuzzy search. For example, as illustrated in FIG. 2, when using "music" as a query term, images including guitar bands are returned as top-related images. For another example, as illustrated in FIG. 3, when using "monk" as a query term, images including a temple and/or shrine are returned as top-related images.

Figure 4:
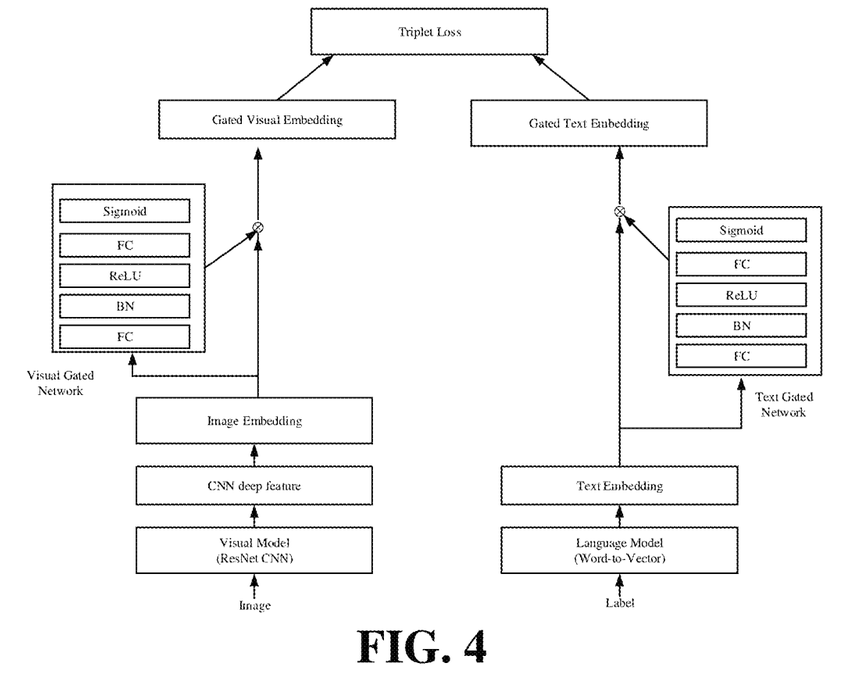
FIG. 4 is a schematic diagram illustrating a framework of a dual gate network according to an implementation of the present disclosure.

Furthermore, in the implementation of the present disclosure, by adopting the dual gate network that includes the visual gated network and the text gated network, a self-attention (a gated network is actually a self-attention mechanism) is added to both a visual part and a text part, and information from the text part can affect set-attention weights of the visual part and vice versa. As illustrated in FIG. 4, the dual gate network assigns weights to features from a pre-trained visual model (i.e., image embedding, corresponding to the first multi-dimensional visual vector described above) and features from a language mode (i.e., text embedding, corresponding to the first multi-dimensional word vector described above). The weighted visual embedding (i.e., the gated visual embedding, corresponding to the second multi-dimensional visual vector described above) and weighted visual text embedding (i.e., the gated text embedding, corresponding to the second multi-dimensional word vector described above) better utilize previous knowledge and create a precise visual and text representation for a search task.

In the implementation of the present disclosure, the dual gate network and a popular residual block have different focuses despite a similar architecture are used. The residual block aims to utilize additional shortcut connections to pass the input directly to the output and ease the model optimization procedure, but the residual block still needs to learn corresponding residuals. In the implementation, features from pre-trained models are already good enough, and what needs to do for the dual gate network is to select features instead of learning new features. In other words, the dual gate network is easily optimized when dealing with insufficient data.

In the implementation of the present disclosure, as illustrated in FIG. 4, a widely used method, i.e., triplet loss, is used to train the dual gate network. The triplet loss aims to optimize an embedding space (i.e., the second space) such that distances between samples with the same identity are much smaller than those between samples with different identities. Stochastic gradient descent (SGD) can be used to iteratively find network parameters. During training, first freeze the pre-trained models (e.g., CNN) for first several epochs to get a good initialization of the visual gated network and the text gated network, and then make the visual gated network and the text gated network learn at the same space.

In the implementation of the present disclosure, as illustrated in FIG. 4 and according to the above illustration, the dual gate network is trained as follows. Generate visual vectors by the visual mode and generate word vectors by the language mode, where the visual vectors and the word vectors are in different embedding spaces. Assign weights to the visual vectors by the visual gated network to obtain weighted visual vectors, and assign weights to the word vectors by the text gated network to obtain weighted word vectors, where the weighted visual vectors and the weighted word vectors are in the same embedding space. Perform, by the Triplet Loss, a network training with the weighted visual vectors and the weighted word vectors to train the dual gate network.

Figure 5:
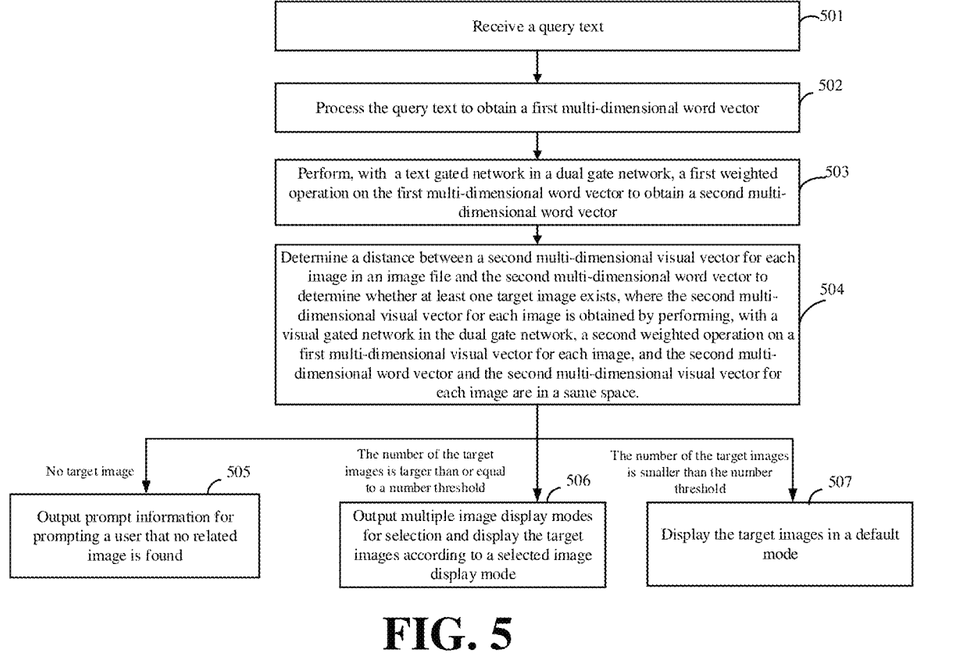
FIG. 5 is a schematic flow chart illustrating a method for image search according to an implementation of the present disclosure.

FIG. 5 is a flow chart illustrating a method for image search according to implementations of the present disclosure.

At block 501, receive a query text.

At block 502, process the query text to obtain a first multi-dimensional word vector.

At block 503, perform, with a text gated network in a dual gate network, a first weighted operation on the first multi-dimensional word vector to obtain a second multi-dimensional word vector.

The operations at blocks 501-503 are similar to the operations at blocks 401-403, which will not be illustrated in detail herein.

At block 504, determine a distance between a second multi-dimensional visual vector for each image in an image file and the second multi-dimensional word vector to determine whether at least one target image exists, where the image file includes multiple images each being associated with one second multi-dimensional visual vector, the second multi-dimensional visual vector for each image is obtained by performing, with a visual gated network in the dual gate network, a second weighted operation on a first multi-dimensional visual vector for each image, and the second multi-dimensional word vector and the second multi-dimensional visual vector for each image are in a same space. For each image, if a distance between the second multi-dimensional visual vector for the image and the second multi-dimensional word vector is smaller than or equal to a distance threshold, determine the image as one target image, otherwise, determine that the image is not a target image. For details of the operation at block 504, reference can be made to the operation at block 104, which will not be repeated herein. When no target image exists, proceed to block 505, when the number (amount) of the target images is larger than or equal to a number threshold, proceed to block 506, and when the number (amount) of the target images is smaller than the number threshold, proceed to block 507.

At block 505, output prompt information for prompting a user that no related image is found.

At block 506, output multiple image display modes for selection and display the target images according to a selected image display mode.

For example, the image display modes may include a mode of displaying images as thumbnails and a mode of displaying image links, where for the mode of displaying image links, when each image link is selected, for example, clicked, a corresponding image is displayed.

At block 507, display the target images in a default mode (for example, each target image is normally displayed).

In the implementation of the present disclosure, process the query text to obtain the first multi-dimensional word vector, perform, with the text gated network in the dual gate network, the first weighted operation on the first multi-dimensional word vector to obtain the second multi-dimensional word vector, and search for the at least one target image according to the second multi-dimensional word vector and the second multi-dimensional visual vector for each image (in the second space), where the second multi-dimensional visual vector for each image is obtained by performing, with the visual gated network in the dual gate network, the second weighted operation on the first multi-dimensional visual vector for each image. With the dual gate network, the second multi-dimensional word vector and the second multi-dimensional visual vector for each image can be obtained by utilizing previous knowledge, that is, by selecting features from pre-trained models with the dual gated network, rather than learning new features, a precise visual and text representation for a search task can be created. With the visual and text representation for the search task, the user does not need to input an exact or pre-defined query text for image search.

Furthermore, in the implementation of the present disclosure, the method for image search is based on a sematic search so different synonyms will lead to a stable and similar search result.

In addition, different image display modes can be presented according to the number of the target images, thereby facilitating image browsing.

Figure 6:
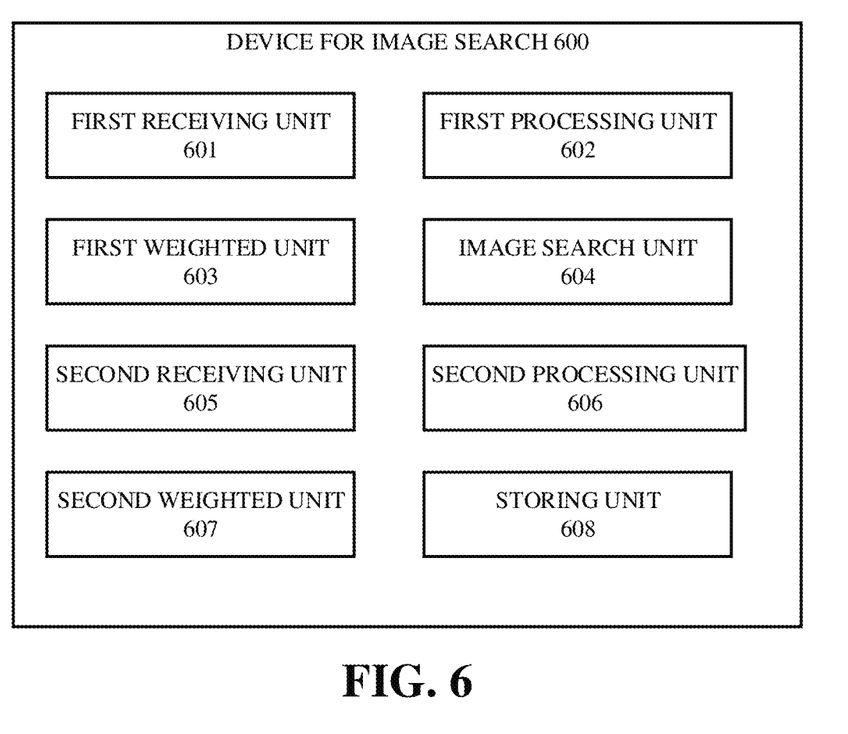
FIG. 6 is a block diagram illustrating a device for image search according to an implementation of the present disclosure.

FIG. 6 is a block diagram illustrating a device for image search according to an implementation of the present disclosure. A device 600 includes a first receiving unit 601, a first processing unit 602, a first weighted unit 603, an image search unit 604, a second receiving unit 605, a second processing unit 606, a second weighted unit 607, and a storing unit 608.

The first receiving unit 601 is configured to receive a query text.

In an implementation, the device is applied to an electronic device such as a smart phone. When an interface for image search is opened, a user can input a text ("query text") into a search bar for searching for one or more desired images. As an example and not by way of limitation, the text may be "car", "music", "monk", or other.

The first processing unit 602 is configured to process the query text to obtain a first multi-dimensional word vector.

In an implementation, a standard language mode can be used to process the query text to obtain the first multi-dimensional word vector. The language mode learns to represent each term as a fixed length embedding vector by predicting adjacent terms in a document. The vector representations are called word vectors. In the implementation, follow Mikolov's method and create a 300-dimensional word vector to represent each image label in the database. For the details of the language mode, reference can be made to Tomas Mikolov et al, Distributed Representations of Words and Phrases and Their Compositionality, NIPS 2013, which will not be described in detail in the implementation of the present disclosure.

In an implementation, as an example and not by way of limitation, the first multi-dimensional word vector is a 300-dimensional word vector, that is, the first multi-dimensional word vector corresponds to a point in a 300-dimensional space (hereinafter, a first space).

The first weighted unit 603 is configured to perform, with a text gated network in a dual gate network, a first weighted operation on the first multi-dimensional word vector to obtain a second multi-dimensional word vector.

In an implementation, the text gated network is represented as $y_{text} = G_{text}(x) \otimes x_{text}$, where $x_{text}$ represents the first multi-dimensional word vector, $y_{text}$ represents the second multi-dimensional word vector, $G_{text}(x)$ is a gating function (i.e., gated network) and represents feature map weights to be learned, $\otimes$ is a channel-wise multiplication between the first multi-dimensional word vector $x_{text}$ and the gating function $G_{text}(x)$, $G_{text}(x) = \sigma_{sigmoid}(W_2 \sigma_{RELU}(BN$ ($W_1 x_{text}$))), $W_1$ and $W_2$ represent two fully-connected layers, BN(•) is a batch normalization layer, $\sigma_{RELU}$ and $\sigma_{sigmoid}$ are activation functions of ReLU and Sigmoid respectively. For example, when $G_{text}(x)$ contains all 1s, all the learned features pass through without gating, which is basically a classic fine-tuning approach and will not be illustrated in detail herein.

In an implementation, the second multi-dimensional word vector refers to a word vector corresponding to a point in a multi-dimensional space (hereinafter, a second space, where the second space is different from the first space).

The image search unit 604 is configured to search for at least one target image according to the second multi-dimensional word vector and a second multi-dimensional visual vector for each of multiple images in an image file, where the second multi-dimensional visual vector for each image is obtained by performing, with a visual gated network in the dual gate network, a second weighted operation on a first multi-dimensional visual vector for each image, and the second multi-dimensional word vector and the second multi-dimensional visual vector for each image are in a same space (i.e., the second space).

In an implementation, as an example and not by way of limitation, the image file may be a photo album that includes multiple photos taken by a camera of the electronic device.

In an implementation, each image associated with one second multi-dimensional visual vector is obtained as follows. The second receiving unit 605 receives the image, for example, when the camera of the electronic device takes an image, the second receiving unit 605 receives the image. The second processing unit 606 extracts deep features of the image and processes the deep features to obtain a first multi-dimensional visual vector for the image. The second weighted unit 607 performs, with the visual gated network, the second weighted operation on the first multi-dimensional visual vector for the image to obtain the second multi-dimensional visual vector for the image. The storing unit 608 stores the image associated with the second multi-dimensional visual vector in the image file.

In an implementation, a standard visual model is used to extract deep features of each image and process the deep features of each image to obtain the first multi-dimensional visual vector for each image. The visual mode is based on the ResNet. The deep neural network model consist of several convolutional filtering (with skip connections), bath normalization, and pooling layers, followed by several fully connected neural network layers. The visual mode is trained with a softmax output layer to predict one of 1000 object categories from the ILSVRC 2012 1K dataset. The output of the last global-pooling-layer, which is a 2048 dimensional vector, serves as a visual vector for an image (i.e., the first multi-dimensional visual vector for an image). For details of the visual mode, reference can be made to Kaiming He et al, Deep Residual Learning for Image Recognition, CVPR 2016, which will not be illustrated in detail herein.

In an implementation, as an example and not by way of limitation, the first multi-dimensional visual vector for each image is a 2048-dimensional visual vector, that is, the first multi-dimensional visual vector corresponds to a point in a 2048-dimensional space (hereinafter, a third space, where the third space is different from the first space and the second space).

In an implementation, the visual gated network is represented as $y_{visual} = G_{visual}(x) \otimes x_{visual}$, where $x_{visual}$ represents the first multi-dimensional visual vector for each image, $y_{visual}$ represents the second multi-dimensional visual vector for each image, $G_{visual}(x)$ is a gating function (i.e., gated network) and represents feature map weights to be learned, $\otimes$ is a channel-wise multiplication between the first multi-dimensional visual vector $x_{visual}$ and the gating function $G_{visual}(x)$, $G_{visual}(X) = \sigma_{sigmoid}(W_2 \sigma_{RELU}(BN(W_1 x_{visual})))$, $W_1$ and $W_2$ represent two fully-connected layers, BN(•) is a batch normalization layer, and $\sigma_{RELU}$ and $\sigma_{sigmoid}$ are activation functions of ReLU and Sigmoid respectively. For example, when $G_{visual}(x)$ contains all 1s, all the learned features pass through without gating, which is basically a classic fine-tuning approach and will not be illustrated in detail herein.

In the implementation of the present disclosure, process the query text to obtain the first multi-dimensional word vector, perform, with the text gated network in the dual gate network, the first weighted operation on the first multi-dimensional word vector to obtain the second multi-dimensional word vector in the second space, and search for the at least one target image according to the second multi-dimensional word vector and the second multi-dimensional visual vector for each image (in the second space), where the second multi-dimensional visual vector for each image is obtained by performing, with the visual gated network in the dual gate network, the second weighted operation on the first multi-dimensional visual vector for each image. With the dual gate network, the second multi-dimensional word vector and the second multi-dimensional visual vector for each image can be obtained by utilizing previous knowledge, that is, by selecting features from pre-trained models with the dual gated network, rather than learning new features, a precise visual and text representation for a search task can be created. With the visual and text representation for the search task, the user does not need to input an exact or pre-defined query text for image search.

In an implementation, the image search unit 604 searches for the at least one target image according to the second multi-dimensional word vector and the second multi-dimensional visual vector for each image in the image file as follows. For each image, if a distance between the second multi-dimensional visual vector for the image and the second multi-dimensional word vector is smaller than or equal to a distance threshold, determine the image as one target image, otherwise, determine that the image is not a target image.

In an implementation, as an example and not by way of limitation, a standard cosine distance is used to determine the distance between the second multi-dimensional visual vector for each image and the second multi-dimensional word vector, which will not be described in detail herein.

In an implementation, if there are more target images, the target images are displayed in ascending order of distances each being a distance between the second multi-dimensional visual vector for each image and the second multi-dimensional word vector.

In an implementation, the image search unit 604 is further configured to display the at least one image. The at least one image is displayed as follows. Output multiple image display modes for selection and display the at least one target image according to a selected image display mode. For example, the image display modes may include a mode of displaying images as thumbnails and a mode of displaying image links, where for the mode of displaying image links, when each image link is selected, for example, clicked, a corresponding image is displayed. Thus, when there are more target images, the user can view the target images without flipping through pages.

In another implementation, the image search unit 604 is configured to display the at least one image as follows.

Output the multiple image display modes for selection and display the at least one target image according to a selected image display mode, when the number of the at least one target image is larger than or equal to a number value. Display the at least one image in a default mode (for example, each image is normally displayed) when the number of the at least one target image is smaller than the number value.

In an implementation, when no target image exists, prompt information is output for prompting the user that no related image is found.

In the implementation of the present disclosure, the device for image search is based on a sematic search so different synonyms will lead to a stable and similar search result. For example, the input texts "car", "vehicle", "automobile" would lead to a similar search result, i.e., car-related images will be returned. In addition to find a directly related concept, semantically related concept can also be retrieved, i.e., perform a fuzzy search. For example, as illustrated in FIG. 2, when using "music" as the query term, images including guitar bands are returned as top-related images. For another example, as illustrated in FIG. 3, when using "monk" as the query term, images including a temple and/or shrine are returned as top-related images.

Furthermore, in the implementation of the present disclosure, by adopting the dual gate network that includes the visual gated network and the text gated network, a self-attention (a gated network is actually a self-attention mechanism) is added to both a visual part and a text part, and information from the text part can affect set-attention weights of the visual part and vice versa. As illustrated in FIG. 4, the dual gate network assigns weights to features from a pre-trained visual model (i.e., image embedding, corresponding to the first multi-dimensional visual vector described above) and features from a language mode (i.e., text embedding, corresponding to the first multi-dimensional word vector described above). The weighted visual embedding (i.e., the gated visual embedding, corresponding to the second multi-dimensional visual vector described above) and weighted visual text embedding (i.e., the gated text embedding, corresponding to the second multi-dimensional word vector described above) better utilize previous knowledge and create a precise visual and text representation for a search task.

In the implementation of the present disclosure, the dual gate network and a popular residual block have different focuses despite a similar architecture are used. The residual block aims to utilize additional shortcut connections to pass the input directly to the output and ease the model optimization procedure, but the residual block still needs to learn corresponding residuals. In the implementation, features from pre-trained models are already good enough, and what needs to do for the dual gate network is to select features instead of learning new features. In other words, the dual gate network is easily optimized when dealing with insufficient data.

In the implementation of the present disclosure, as illustrated in FIG. 4, a widely used method, i.e., triplet loss, is used to train the dual gate network. The triplet loss aims to optimize an embedding space (i.e., the second space) such that distances between samples with the same identity are much smaller than those between samples with different identities. Stochastic gradient descent (SGD) can be used to iteratively find network parameters. During training, first freeze the pre-trained models (e.g., CNN) for first several epochs to get a good initialization of the visual gated network and the text gated network, and then make the visual gated network and the text gated network learn at the same space.

In the implementation of the present disclosure, as illustrated in FIG. 4 and according to the above illustration, the dual gate network is trained as follows. Generate visual vectors by the visual mode and generate word vectors by the language mode, where the visual vectors and the word vectors are in different embedding spaces. Assign weights to the visual vectors by the visual gated network to obtain weighted visual vectors, and assign weights to the word vectors by the text gated network to obtain weighted word vectors, where the weighted visual vectors and the weighted word vectors are in the same embedding space. Perform, by the Triplet Loss, a network training with the weighted visual vectors and the weighted word vectors to train the dual gate network.

Figure 7:
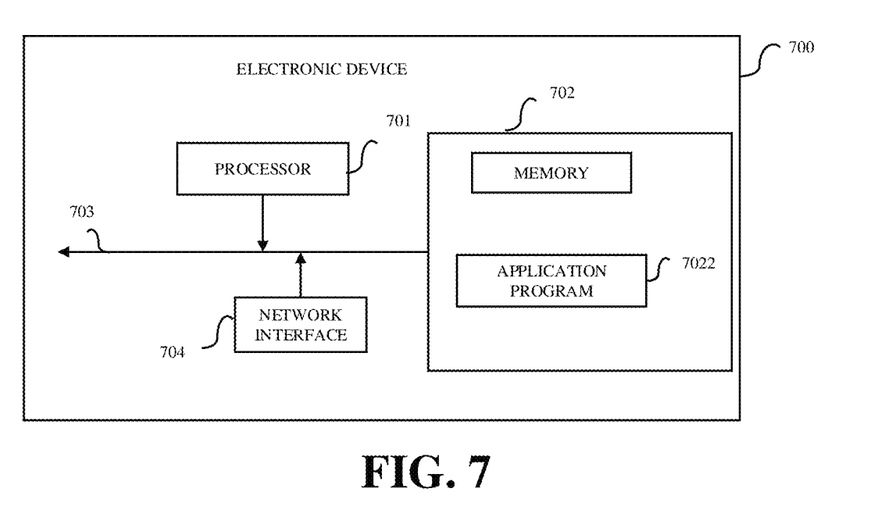
FIG. 7 is a block diagram illustrating an electronic device according to an implementation of the present disclosure.

FIG. 7 is a schematic block diagram illustrating an electronic device according to an implementation of the present disclosure. An electronic device 700 includes at least one processor 701, a memory 702, and at least one network interface 704. Various components of the electronic device 700 are coupled with each other via a system bus 703. It can be understood that the system bus 703 is configured to realize a connection communication among these components. The system bus 703 not only includes a data bus, but also includes a power bus, a control bus, and a state signal bus. However, for the sake of clear illustration, in FIG. 7 various buses are called the system bus 703.

It can be understood that the memory 702 may be a volatile memory or a non-volatile memory, and may also include both the volatile memory and non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a disc, or a compact disc read-only memory (CD-ROM). The magnetic surface memory may be a disk memory or a magnetic tape memory. The volatile memory may be a random access memory (RAM) and used for external high-speed cache. By way of examples, but not limitation, various random access memories can be used, for example, a static random access memory (SRAM), a synchronous static random access memory (SSRAM), a dynamic random access memory (DRAM), a synchronous dynamic random access memory (SDRAM), a double data rate synchronous dynamic random access memory (SDRAM), an enhanced synchronous dynamic random access memory (ESDRAM), a synclink dynamic random access memory (SLDRAM), and a direct rambus random access memory (DRRAM). The memory 702 described in this implementation of the present disclosure is intended to include but is not limited to these and any other suitable types of memory.

The memory 702 in the implementation of the present disclosure is configured to store various types of data to support operations of the electronic device 700. Examples of these data include any computer program operated on the electronic device 700, such as an application program 7022. The program for implementing the method provided in the implementation of the present disclosure may be contained in the application program 7022.

The methods disclosed in the foregoing implementations of the present disclosure may be applied to the processor 701 or implemented by the processor 701. The processor 701 may be an integrated circuit chip with signal processing capabilities. In the implementation process, each step of the above methods may be completed by an integrated logic circuit in the form of hardware in the processor 701 or an instruction in the form of software. The above-mentioned processor 701 may be a general-purpose processor, a digital signal processor (DSP), or other programmable logic device, a discrete gate, a transistor logic device, a discrete hardware assembly, and the like. The processor 701 may implement or execute the methods, steps, and logical block diagrams disclosed in the implementations of the present disclosure. The general-purpose processor may be a microprocessor or any conventional processor. The steps of the methods disclosed in the implementations of the present disclosure may be directly executed and completed by a hardware decoding processor, or may be executed and completed by a combination of hardware and software modules in the decoding processor. The software modules may be in in the memory 702. The processor 701 reads information in the memory 702 and completes the steps of the foregoing methods.

In an implementation, the electronic device 700 may be implemented with one or more application specific integrated circuits (ASICs), DSPs, programmable logic devices (PLDs), complex programmable logic devices (CPLDs), field-programmable gate arrays (FPGAs), general-purpose processors, controllers, micro control units (MCUs), microprocessor unit (MPUs), or other electronic components, and the electronic device 700 is configured to implement the aforementioned methods.

The present disclosure is described with reference to flowcharts and/or block diagrams of the methods, devices (systems), and computer program products provide in the implementations of the present disclosure. It can be understood that each flow in the flow chart and/or each block in the block diagram and a combination of flows in the flow chart and/or blocks in the block diagram may be implemented by computer program instructions. These computer program instructions can be installed in a processor of a general-purpose computer, a special-purpose computer, an embedded processing machine, or other programmable data processing device to produce a machine, so as to produce a device with instructions executed by the processor of the computer or other programmable data processing device, where the device is configured to realize functions specified in one flow or multiple flows in a flow chart and/or one block or multiple blocks in a block diagram.

These computer program instructions may also be stored in a computer readable memory that can guide a computer or other programmable data processing device to work in a specific manner, so that the instructions stored in the computer readable memory can enable a generation of a product including an instruction device. The instruction device implements the functions specified in one flow or multiple flows in a flow chart and/or one block or multiple blocks in a block diagram.

These computer program instructions can also be loaded onto a computer or other programmable data processing device, so that a series of operating steps can be performed on the computer or other programmable device to generate computer-implemented processing, and thus the instructions executed on the computer or other programmable device can provide steps for implementing the functions specified in one flow or multiple flows in a flow chart and/or one block or multiple blocks in a block diagram.

The above are only preferred implementations of the present disclosure and not intended to limit the protection scope of the present disclosure. Any modification, equivalent replacement and improvement made within the spirit and principle of the present disclosure should be within the protection scope of the present disclosure

What is claimed is:

1. A method for image search, comprising:
   receiving a query text;
   processing the query text to obtain a first multi-dimensional word vector;
   performing, with a text gated network in a dual gate network, a first weighted operation on the first multi-dimensional word vector to obtain a second multi-dimensional word vector; and
   searching for at least one target image according to the second multi-dimensional word vector and a second multi-dimensional visual vector for each of a plurality of images in an image file, wherein the second multi-dimensional visual vector for each of the plurality of images is obtained by performing, with a visual gated network in the dual gate network, a second weighted operation on a first multi-dimensional visual vector for each of the plurality of images, and the second multi-dimensional word vector and the second multi-dimensional visual vector for each of the plurality of images are in a same space.

2. The method of claim 1, further comprising:
   prior to receiving the query text:
   receiving each of the plurality of images;
   extracting deep features of each of the plurality of images;
   processing the deep features of each of the plurality of images to obtain the first multi-dimensional visual vector for each of the plurality of images;
   performing, with the visual gated network, the second weighted operation on the first multi-dimensional visual vector for each of the plurality of images to obtain the second multi-dimensional visual vector for each of the plurality of images; and
   storing each of the plurality of images associated with one second multi-dimensional visual vector in the image file.

3. The method of claim 1, wherein the dual gate network is trained by:
   generating visual vectors by a visual mode and generating word vectors by a language mode, wherein the visual vectors and the word vectors are in different embedding spaces;
   assigning weights to the visual vectors by the visual gated network to obtain weighted visual vectors, and assigning weights to the word vectors by the text gated network to obtain weighted word vectors, wherein the weighted visual vectors and the weighted word vectors are in a same embedding space; and
   performing, by Triplet Loss, a network training with the weighted visual vectors and the weighted word vectors to train the dual gate network.

4. The method of claim 1, wherein
   the text gated network is represented as $y_{text}=G_{text}(x) \otimes x_{text}$, wherein $x_{text}$ represents the first multi-dimensional word vector, $y_{text}$ represents the second multi-dimensional word vector, $G_{text}(x)=\sigma_{sigmoid}(W_2 \sigma_{RELU}(BN(W_1 x_{text})))$, and $\otimes$ is a channel-wise multiplication, wherein $W_1$ and $W_2$ represent two fully-connected layers, BN(•) is a batch normalization layer, $\sigma_{RELU}$ and $\sigma_{sigmoid}$ are activation functions of ReLU and Sigmoid respectively.

5. The method of claim 1, wherein
   the visual gated network is represented as $y_{visual}=G_{visual}(X) \otimes x_{visual}$, wherein $x_{visual}$ represents the first multi-dimensional visual vector for each of the plurality of images, $y_{visual}$ represents the second multi-dimensional visual vector for each of the plurality of images, $G_{visual}(x)=\sigma_{sigmoid}(W_2\sigma_{RELU}(BN(W_1 x_{visual})))$, and $\otimes$ is a channel-wise multiplication, wherein $W_1$ and $W_2$ represent two fully-connected layers, BN(•) is a batch normalization layer, $\sigma_{RELU}$ and $\sigma_{sigmoid}$ are activation functions of ReLU and Sigmoid respectively.

6. The method of claim 1, wherein searching for the at least one target image according to the second multi-dimensional word vector and the second multi-dimensional visual vector for each of the plurality of images comprises:
for each image, determining the image as one target image on condition that a distance between the second multi-dimensional visual vector for the image and the second multi-dimensional word vector is smaller than or equal to a distance threshold.

7. The method of claim 1, further comprising:
outputting a plurality of image display modes for selection and displaying the at least one target image according to a selected image display mode, when the number of the at least one target image is larger than or equal to a number threshold; and
displaying the at least one target image in a default mode when the number of the at least one target image is smaller than the number threshold.

8. The method of claim 7, wherein the plurality of image display modes comprise at least a mode of displaying images as thumbnails and a mode of displaying image links, wherein for the mode of displaying image links, when each image link is selected, a corresponding image is displayed.

9. An electronic device, comprising:
a processor; and
a memory storing at least one computer program which, when executed by the processor, causes the electronic device to:
receive a query text;
process the query text to obtain a first multi-dimensional word vector;
perform, with a text gated network in a dual gate network, a first weighted operation on the first multi-dimensional word vector to obtain a second multi-dimensional word vector; and
search for at least one target image according to the second multi-dimensional word vector and a second multi-dimensional visual vector for each of a plurality of images in an image file, wherein the second multi-dimensional visual vector for each of the plurality of images is obtained by performing, with a visual gated network in the dual gate network, a second weighted operation on a first multi-dimensional visual vector for each of the plurality of images, and the second multi-dimensional word vector and the second multi-dimensional visual vector for each of the plurality of images are in a same space.

10. The electronic device of claim 9, wherein the at least one computer program is further executed by the processor to cause the electronic device to:
receive each of the plurality of images;
extract deep features of each of the plurality of images and process the deep features of each of the plurality of images to obtain the first multi-dimensional visual vector for each of the plurality of images;
perform, with the visual gated network, the second weighted operation on the first multi-dimensional visual vector for each of the plurality of images to obtain the second multi-dimensional visual vector for each of the plurality of images; and store each of the plurality of images associated with one second multi-dimensional visual vector in the image file.

11. The electronic device of claim 9, wherein the at least one computer program is further executed by the processor to cause the electronic device to train the dual gate network by:
generating visual vectors by a visual mode and generating word vectors by a language mode, wherein the visual vectors and the word vectors are in different embedding spaces;
assigning weights to the visual vectors by the visual gated network to obtain weighted visual vectors, and assigning weights to the word vectors by the text gated network to obtain weighted word vectors, wherein the weighted visual vectors and the weighted word vectors are in a same embedding space; and
performing, by Triplet Loss, a network training with the weighted visual vectors and the weighted word vectors to train the dual gate network.

12. The electronic device of claim 9, wherein the text gated network is represented as $y_{text}=G_{text}(X)\otimes x_{text}$, wherein $x_{text}$ represents the first multi-dimensional word vector, $y_{text}$ represents the second multi-dimensional word vector, $G_{text}(x)=\sigma_{sigmoid}(W_2\sigma_{RELU}(BN(W_1 x_{text})))$, and $\otimes$ is a channel-wise multiplication, wherein $W_1$ and $W_2$ represent two fully-connected layers, BN(•) is a batch normalization layer, $\sigma_{RELU}$ and $\sigma_{sigmoid}$ are activation functions of ReLU and Sigmoid respectively.

13. The electronic device of claim 9, wherein the visual gated network is represented as $y_{visual}=G_{visual}(x)\otimes x_{visual}$, wherein $x_{visual}$ represents the first multi-dimensional visual vector for each of the plurality of images, $y_{visual}$ represents the second multi-dimensional visual vector for each of the plurality of images, $G_{visual}(X)=\sigma_{sigmoid}(W_2\sigma_{RELU}(BN(W_1 x_{visual})))$, and $\otimes$ is a channel-wise multiplication, wherein $W_1$ and $W_2$ represent two fully-connected layers, BN(•) is a batch normalization layer, $\sigma_{RELU}$ and $\sigma_{sigmoid}$ are activation functions of ReLU and Sigmoid respectively.

14. The electronic device of claim 9, wherein the at least one computer program executed by the processor to cause the electronic device to search for the at least one target image according to the second multi-dimensional word vector and the second multi-dimensional visual vector for each of the plurality of images is executed by the processor to cause the electronic device to determine, for each image, the image as one target image on condition that a distance between the second multi-dimensional visual vector for the image and the second multi-dimensional word vector is smaller than or equal to a distance threshold.

15. The electronic device of claim 9, wherein the at least one computer program is further executed by the processor to cause the electronic device to:
output a plurality of image display modes for selection and display the at least one target image according to a selected image display mode, when the number of the at least one target image is larger than or equal to a number threshold; and
display the at least one target image in a default mode when the number of the at least one target image is smaller than the number threshold.

16. The electronic device of claim 15, wherein the plurality of image display modes comprise at least a mode of displaying images as thumbnails and a mode of displaying image links, wherein for the mode of displaying image links, when each image link is selected, a corresponding image is displayed.

17. A non-transitory computer-readable storage medium storing at least one computer program, the at least one computer program which, when executed by a processor of an electronic device, causes the electronic device to:
receive a query text;
process the query text to obtain a first multi-dimensional word vector;
perform, with a text gated network in a dual gate network, a first weighted operation on the first multi-dimensional word vector to obtain a second multi-dimensional word vector; and
search for at least one target image according to the second multi-dimensional word vector and a second multi-dimensional visual vector for each of a plurality of images in an image file, wherein the second multi-dimensional visual vector for each of the plurality of images is obtained by performing, with a visual gated network in the dual gate network, a second weighted operation on a first multi-dimensional visual vector for each of the plurality of images, and the second multi-dimensional word vector and the second multi-dimensional visual vector for each of the plurality of images are in a same space.

18. The non-transitory computer-readable storage medium of claim 17, wherein the least one computer program is further executed by the processor to cause the electronic device to:
receive each of the plurality of images;
extract deep features of each of the plurality of images and process the deep features of each of the plurality of images to obtain the first multi-dimensional visual vector for each of the plurality of images;
perform, with the visual gated network, the second weighted operation on the first multi-dimensional visual vector for each of the plurality of images to obtain the second multi-dimensional visual vector for each of the plurality of images; and
store each of the plurality of images associated with one second multi-dimensional visual vector in the image file.

19. The non-transitory computer-readable storage medium of claim 17, wherein the at least one computer program is further executed by the processor to cause the electronic device to train the dual gate network by:
generating visual vectors by a visual mode and generating word vectors by a language mode, wherein the visual vectors and the word vectors are in different embedding spaces;
assigning weights to the visual vectors by the visual gated network to obtain weighted visual vectors, and assigning weights to the word vectors by the text gated network to obtain weighted word vectors, wherein the weighted visual vectors and the weighted word vectors are in a same embedding space; and
performing, by Triplet Loss, a network training with the weighted visual vectors and the weighted word vectors to train the dual gate network.

20. The non-transitory computer-readable storage medium of claim 17, wherein the text gated network is represented as $y_{text}=G_{text}(x)\otimes x_{text}$, wherein $x_{text}$ represents the first multi-dimensional word vector, $y_{text}$ represents the second multi-dimensional word vector, $G_{text}(x)=\sigma_{sigmoid}(W_2\sigma_{RELU}(BN(W_1 x_{text})))$, and $\otimes$ is a channel-wise multiplication, wherein $W_1$ and $W_2$ represent two fully-connected layers, $BN(\bullet)$ is a batch normalization layer, $\sigma_{RELU}$ and $\sigma_{sigmoid}$ are activation functions of ReLU and Sigmoid respectively.

* * * * *